United States Patent
Carlson et al.

(10) Patent No.: US 10,678,854 B1
(45) Date of Patent: Jun. 9, 2020

(54) APPROXIMATE STRING MATCHING IN SEARCH QUERIES TO LOCATE QUOTES

(71) Applicant: Amazon Technologies, Inc., Seattle, WA (US)

(72) Inventors: Adam Carlson, Seattle, WA (US); Corey Anthony Masanto, Baldwin, NY (US); Ahmed Mustafa, Sammamish, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 573 days.

(21) Appl. No.: 15/067,733

(22) Filed: Mar. 11, 2016

(51) Int. Cl.
| | |
|---|---|
| *G06F 16/00* | (2019.01) |
| *G06F 16/783* | (2019.01) |
| *G06F 16/22* | (2019.01) |
| *G06F 16/174* | (2019.01) |
| *G06F 16/2458* | (2019.01) |
| *G06F 16/683* | (2019.01) |
| *G06F 16/9535* | (2019.01) |
| *G06F 16/2457* | (2019.01) |

(52) U.S. Cl.
CPC ...... *G06F 16/7844* (2019.01); *G06F 16/1744* (2019.01); *G06F 16/22* (2019.01); *G06F 16/2468* (2019.01); *G06F 16/685* (2019.01); *G06F 16/783* (2019.01); *G06F 16/7834* (2019.01); *G06F 16/24578* (2019.01); *G06F 16/9535* (2019.01); *G06F 2207/025* (2013.01)

(58) Field of Classification Search
CPC ......... G06F 17/30787; G06F 17/30153; G06F 17/30312; G06F 17/3053; G06F 17/30867
See application file for complete search history.

(56) References Cited

U.S. PATENT DOCUMENTS

| | | | |
|---|---|---|---|
| 9,031,997 B2 * | 5/2015 | Chelliah | H03M 7/707 707/802 |
| 9,165,072 B1 * | 10/2015 | Mayo | G06F 17/30796 |
| 9,858,967 B1 * | 1/2018 | Nomula | G11B 27/06 |
| 2009/0019009 A1 * | 1/2009 | Byers | G11B 27/105 |
| 2011/0082880 A1 * | 4/2011 | Adimatyam | G06F 16/48 707/770 |
| 2011/0246181 A1 * | 10/2011 | Liang | G06F 16/93 704/9 |
| 2012/0303629 A1 * | 11/2012 | Klein | G06F 16/907 707/741 |
| 2012/0311624 A1 * | 12/2012 | Oskolkov | H04N 21/2541 725/25 |
| 2014/0172836 A1 * | 6/2014 | Chowdhury | G11B 27/002 707/722 |
| 2014/0325359 A1 * | 10/2014 | Vehovsky | H04N 9/8205 715/723 |
| 2016/0188603 A1 * | 6/2016 | Weger | G06F 16/24578 707/725 |
| 2017/0195753 A1 * | 7/2017 | Dakss | H04N 21/8456 |

\* cited by examiner

*Primary Examiner* — Diedra McQuitery
(74) *Attorney, Agent, or Firm* — Thomas | Horstemeyer, LLP (57) ABSTRACT

Disclosed are various embodiments for employing approximate string matching in search queries to locate quotes, such as popular quotes in movies or other media. A quote database may be constructed to respond to search queries that include a quote by identifying approximate matches of the quote in closed captioning files. If an approximate match of a quote resides in the closed captioning file, information associated with the closed captioning file, such as a start time and an end time, may be added to the quote database for use in future searches.

20 Claims, 8 Drawing Sheets

APPROXIMATE STRING MATCHING IN SEARCH QUERIES TO LOCATE QUOTES

BACKGROUND

Search engines are typically employed by users to search for a listing of network sites pertaining to particular subject matter. The user may be required to navigate each network site in the listing to locate information or the user may be required to further refine his or her search query. Searching for a particular string of text, such as a quote from a product manual or a movie quote, remains problematic.

FIELD OF THE INVENTION

Aspects of the present disclosure relate to search engine querying and optimization, database creation and optimization, video processing, and artificial intelligence.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for employing approximate string matching in search queries to locate quotes, such as popular quotes in movies or other media. When a user performs a search for a quote or other string of text, a search engine can navigate an index of network sites looking for particular instances of a search string in the index. The search engine can return a listing of network sites that mention keywords from the search query while not providing the user the source of the quote or other desired information.

According to various embodiments as described herein, a database of quotes may be generated for use in optimizing search queries and enhancing a user's search experience. In one embodiment, a quote made in a search query is accessed, and an item pertaining to the quote is identified. In some examples, the item may be an electronic commerce item or, in other examples, the item may be a movie, a television show, a documentary, or other media content (referred to herein as "movie" for purposes of explanation).

A quote database having a listing of quotes may be queried using approximate string matching, also referred to as fuzzy matching, to determine whether an approximate match of the quote resides in the quote database. If an approximate match of the quote is not found in the quote database, another file may be consulted, such as a closed captioning file corresponding to the media title or a product manual corresponding to an electronic commerce item.

The closed captioning file may be searched using approximate string matching to determine whether an approximate match of the quote resides in the closed captioning file. If the approximate match of the quote is located in the closed captioning file, a start time and an end time for the quote from the closed captioning file may be identified and a media clip may be extracted that corresponds to the start time and the end time.

In the following discussion, a general description of the system and its components is provided, followed by a discussion of the operation of the same.

Figure 1:
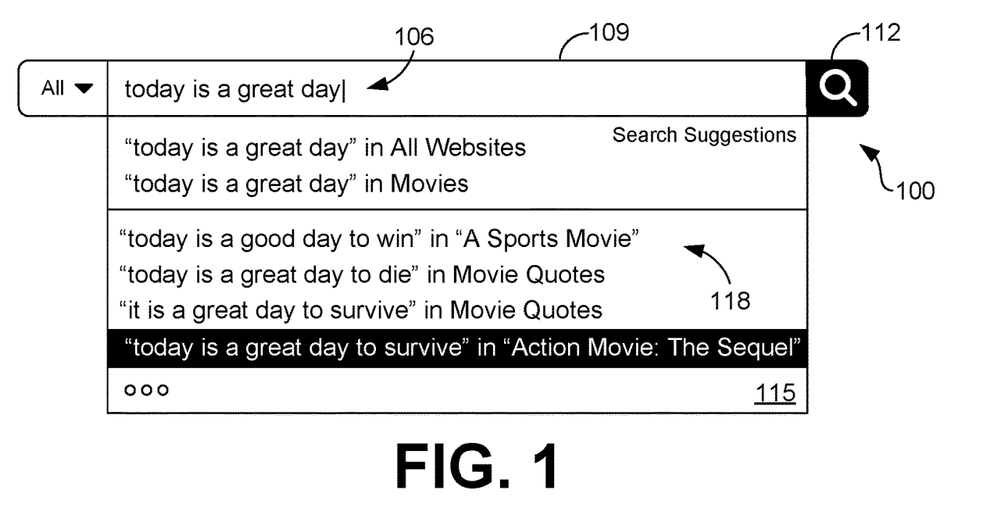
FIG. 1 is an example of a user interface component that facilitates providing a search query according to various embodiments of the present disclosure.

With reference to FIG. 1, shown is a search component 100 that may be employed by a search engine application, a movie database application, an electronic commerce application, or similar application, which may be used to perform searches by providing a search query 106 in a text area 109. In one example, a user may search for network sites pertaining to subject matter identified in the search query 106. In another example, a user may search for a famous quote, such as a quote made famous by a particular movie. In yet another example, a user may search for various items, such as items capable of being purchased, leased, downloaded, or otherwise consumed by way of the electronic commerce application.

In various embodiments, the search component 100 may include a search engine auto-complete component 115, which can include a dropdown menu or other similar user interface component that shows suggested searches 118 to the user. Suggested searches 118 may include searches performed frequently by users or search results identified based on a current state of the search query 106. However, when searching for a quote from a particular movie, users are sometimes unable to properly recite an exact use of the quote. For example, a user may enter "today is a great day to survive" as the search query 106 when, in fact, the quote from the particular movie actually recites, "it is a great day to survive."

Traditional search engine applications provide a limited user interface experience by only listing network sites reciting the same or similar quote. If a search engine application provides the user with additional information pertaining to the quote or the corresponding movie, the information is gleaned from the listed network sites. According to various embodiments described herein, files, such as closed captioning files for movies or product manuals for electronic commerce items, may be leveraged to identify quotes from the files and provide related information to the user to improve the user interface experience.

Further, a technical problem in the field of search engine optimization exists as vast amounts of documents or other files, such as closed captioning files, are required for a complete search query to be performed. For example, locating an unpopular quote from a popular movie, or vice versa, may require searching hundreds to thousands of documents. According to various embodiments described herein, a dynamic database of search content, such as movie quotes, may be created using approximate string matching. In some embodiments, the dynamic database may be consulted prior to searching one or more closed captioning files. Additionally, the search content may be crowdsourced to enhance accuracy, as will be described.

Figure 2:
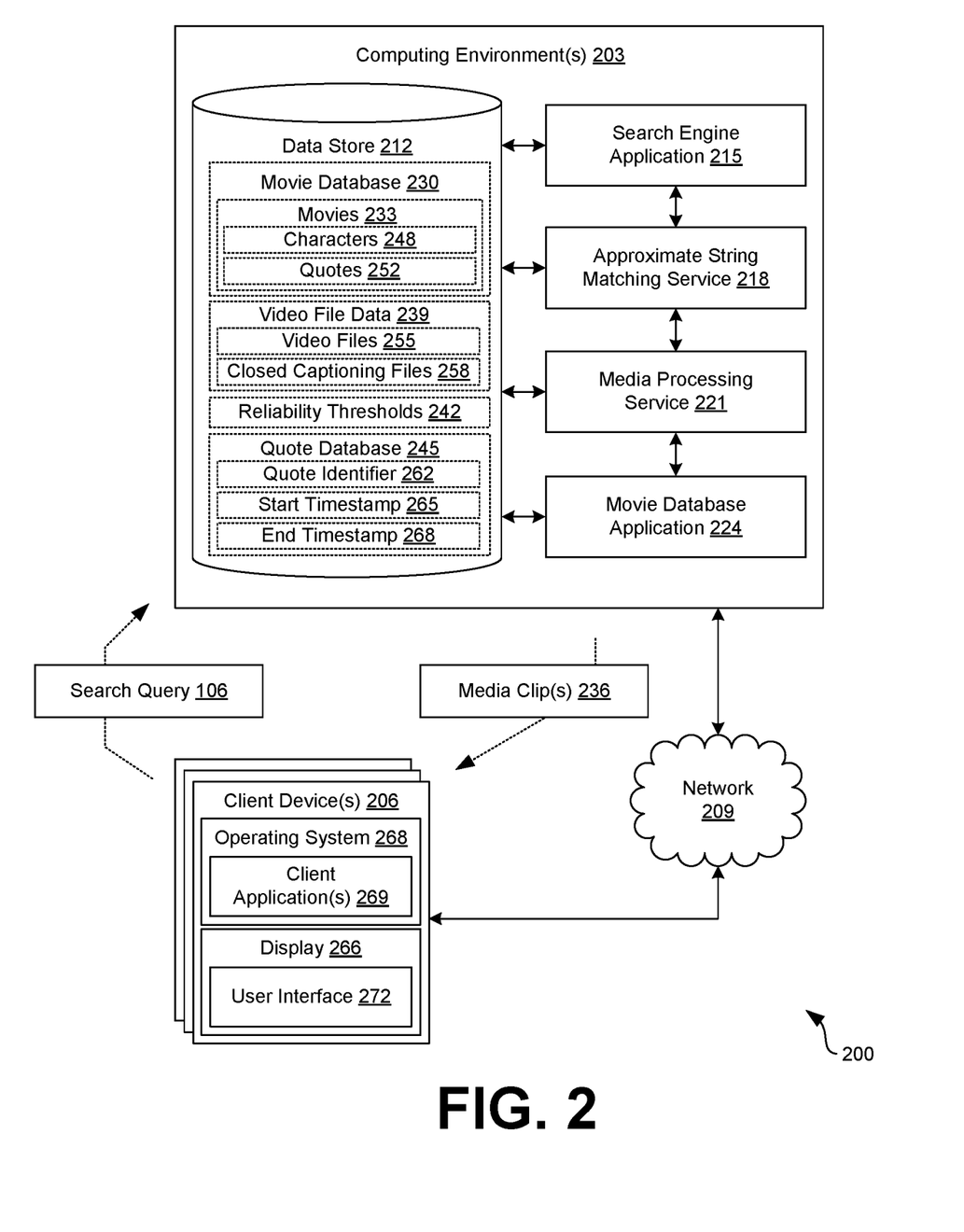
FIG. 2 is a drawing of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may include satellite networks, cable networks, Ethernet networks, and other types of networks.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may include a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a search engine application 215, an approximate string matching service 218, a media processing service 221, a movie database application 224, and other applications, services, processes, systems, engines, or functionality not discussed in detail herein.

The search engine application 215 can provide a listing of search results based on a provided search query to a requestor. The search engine application 215 also performs various backend functions associated with providing search results to a user of a client device 206. For example, the search engine application 215 generates network pages, such as web pages or other types of network content, that are provided to client devices 206 for the purposes of conducting searches and returning search results.

The approximate string matching service 218 is executed to locate strings that match an approximate pattern, as opposed to an exact pattern. For a given query, the approximate string matching service 218 may locate approximate substring matches inside a file and locate dictionary strings that match the pattern approximately. A closeness of a match may be quantified as a metric that is based upon how many primitive operations are required to be performed to convert a word, phase, or other combination of letters from a search query into an exact match.

The media processing service 221 is executed to generate media clips 236 from a video file, such as a file for a movie 233, television show, documentary, or other type of media content. In one embodiment, the media processing service 221 may generate a media clip 236 for rendering on the client device 206 that includes audio, video, or a combination thereof extracted from a scene of a movie 233 during which a quote is recited.

The movie database application 224 includes a network site associated with a movie database 230 where users can navigate pages or other user interfaces to view information pertaining to movies 233 or other similar media content. In some embodiments, the movie database application 224 facilitates the purchase, lease, rent, download, or other consumption of various items over the network 209, such as media files used to play the movies 233 on the client device 206. The movie database application 224 may generate network pages, such as web pages or other types of network content that are provided to client devices 206 for the purposes of selecting items for purchase, rental, download, lease, or other form of consumption as will be described. While many of the embodiments described herein relate to movies 233 for the sake of explanation, further embodiments include television shows, documentaries, cartoons, short films, or other similar media content.

The data stored in the data store 212 includes, for example, the movie database 230, video file data 239, reliability thresholds 242, a quote database 245, and potentially other data. The movie database 230 includes information pertaining to movies 233 and other media content. For a given movie 233, various information may be stored in the data store 212, such as data pertaining to characters 248, quotes 252, scenes, actors, genres, directors, producers, filming locations, and other similar information. In some embodiments, the information stored in the movie database 230 may be crowdsourced from users of the movie database application 224. For example, users may be able to submit information pertaining to a movie 233 while other users vet the information by interacting with the information, up-voting or down-voting the information, etc.

The video file data 239 may include video files 255, closed captioning files 258, and other information pertaining to a movie 233 or other type of media content. The video files 255 may include files in one or more formats, such as MPEG, AVI, MOV, SWF, or other suitable format. The closed captioning files 258 include files that are traditionally used by media player applications or media player devices to render captions or subtitles on a display during a playback of a video file 255. To this end, a closed captioning file 258 may correspond to a video files 255, which may be used to play a movie 233.

The client device 206 is representative of a plurality of client devices 206 that may be coupled to the network 209. The client device 206 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 266. The display 266 may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute an operating system 268, various client applications 269, and/or other applications. One or more of the client applications 269 may be executed in a client device 206, for example, to access network content served up by the computing environment 203 and/or other servers, thereby rendering a user interface 272 on the display 266. To this end, the client application 269 may include, for example, a browser, a dedicated application, etc., and the user interface 272 may include a network page, an application screen, etc. The client device 206 may be configured to execute applications beyond the client application 269 such as, for example, email applications, social networking applications, word processors, spreadsheets, and/or other applications.

Next, a general description of the operation of the various components of the networked environment 200 is provided. To begin, it is assumed that the components of the computing environment 203 may be employed to provide quotes 252 or associated information to a requesting service, such as the client device 206. While the search engine application 215 may have access to files pertaining to a search query 106, such as closed captioning files 258, searching individual files can be processor- and network-intensive. Accordingly, it may be beneficial for the computing environment 203 to build a quote database 245 independent from the closed captioning files 258 for use in identifying quotes 252 in future requests.

The computing environment 203 may construct the quote database 245 using quotes 252 crowdsourced from users of the movie database application 224. For example, a user may submit a quote 252 for a particular movie 233 through the movie database application 224 where other users are able to vet whether the quote 252 is an accurate portrayal of a line or conversation made by one or more characters 248 of the movie 233. As the movie database application 224 maintains quotes 252 for the movie database 230, the computing environment 203 may query the data store 212 to identify popularly accessed or searched quotes 252, for which the quote database 245 may be constructed.

Using a quote 252 identified from the data store 212, the closed captioning files 258 for the movies 233 may be accessed and searched using the quote 252. A closed captioning file 258 may include plain-text data used by media player applications or like devices to render subtitles or captions on a display during corresponding portions of the movie 233. An example of a line in a plain-text closed captioning file 258 may include:

[01:35:15] Today is a good day to survive [01:36:35], where the caption "Today is a good day to survive" is shown on the screen at one hour, thirty-five minutes, and fifteen seconds in the movie 233 for a duration of one-minute and twenty seconds, or until one hour, thirty-six minutes, and thirty-five seconds is reached.

As closed captioning files 258 may not contain a verbatim representation of the quote 252, the approximate string matching service 218 may be employed to perform approximate string matching, also referred to as fuzzy matching. Approximate string matching relates to the process of comparing two items and determining a level of similarity between the two items. The approximate string matching service 218 may generate a metric that describes a similarity between a word or phrase in the search query 106 as compared to a word or phrase in the closed captioning file 258. If the metric meets a reliability threshold 242 that indicates that the two items are, in fact, a match, the search may yield the location, line numbers, or instance of the match in the closed captioning file 258.

As may be appreciated, in some movies 233, a quote 252 may occur in more than one location of the movie 233. If more than one match has been located in a closed captioning file 258, a relevancy score for each match in the closed captioning file 258 may be generated. The relevancy score may be used to determine whether an instance of the quote 252 appearing in the closed captioning file 258 is likely to be the quote 252 for which the user searched.

For example, a user may desire to find the instance where a notable character recited the quote 252 in a popular scene, as opposed to a minor character reciting the quote 252 in a less popular scene. The relevancy score for a quote 252 appearing in the closed captioning file 258 may be determined based on a character 248 reciting the quote 252, a time at which the quote 252 will be rendered during a playback of the movie 233, as well as other factors.

In further embodiments, the instance of the quote 252 identified by the approximate string matching service 218 may be vetted by users of the movie database application 224. The media processing service 221 can generate media clips 236 of the different instances of the quote 252 in the movie 233 for rendering in a network page of the movie database application 224. Media clips 236 associated with a particular quote 252 may be viewed more than media clips 236 reciting a less popular instance of the quote 252. Accordingly, the instance of the quote 252 for the more-viewed one of the media clips 236 may be associated with a higher relevancy score than the instance of the quote 252 for the less-viewed one of the media clips 236.

When an instance of a quote 252 is located in a closed captioning file 258, the instance may be stored in the quote database 245 in association with a quote identifier 262 that uniquely identifies the quote 252, a start timestamp 265, and an end timestamp 268. In some embodiments, the start timestamp 265 and the end timestamp 268 may be generated using the start time and the end time included in tags surrounding the quote 252 in the closed captioning file 258. In other embodiments, the start timestamp 265 and the end timestamp 268 may be crowdsourced from users of a network site, such as users of the movie database application 224.

The media processing service 221 may generate a media clip 236 that includes the instance of the quote 252 in the movie 233. For example, the media clip 236 may include audio, video, or a combination thereof obtained from the video file 255 corresponding to the movie 233. In one embodiment, a scene of the movie 233 may be cut from the video file 255 using the start timestamp 265 of the quote 252 and the end timestamp 268.

The computing environment 203 can serve up the media clip 236 in response to a search query performed for the quote 252 by a user of the search engine application 215. In other embodiments, the movie database application 224 can encode the media clip 236 in a network page or other user interface 272 for access by the user. If a user accesses a network page or user interface screen for a movie 233, the movie database application 224 can serve up one or more media clips 236 having quotes 252 used in the movie 233. As the quotes 252 used to build the quote database 245 may be popular quotes 252 frequently searched or otherwise vetted by users of the movie database application 224, only media clips 236 reciting popular quotes 252 may be rendered.

As can be appreciated, the quote database 245 is updated and improved as more search queries 106 are made. Further, the quote database 245 can be used for various purposes beyond generating a media clip 236 reciting a popular quote 252. In one example, a user may provide a sentence, phrase, or other combination of words to generate a media clip 236 that has a "mash up" of scenes from movies 233 or other media content. Using the string, the quote database 245 can be queried to identify one or more movies 233 that recite the words or phrases in the string to create a media clip 236 that uses portions of different movies 233 to recite the phrase.

For example, if the user provides an input string of "happy birthday to my wife," the quote database 245 can be queried to identify a first movie 233 that recites the phrase "happy birthday" and a second movie 233 that recites the phrase "to my wife." Using the start timestamp 265 and the end timestamp 268 for each quote 252, the portion of the first movie 233 that includes a character 248 reciting "happy birthday" may be extracted and combined with the portion of the second movie 233 that recites "to my wife." Ultimately, a media clip 236 is generated that recites the provided phrase using a combination of scenes from different movies 233 or other media content.

Figure 3:
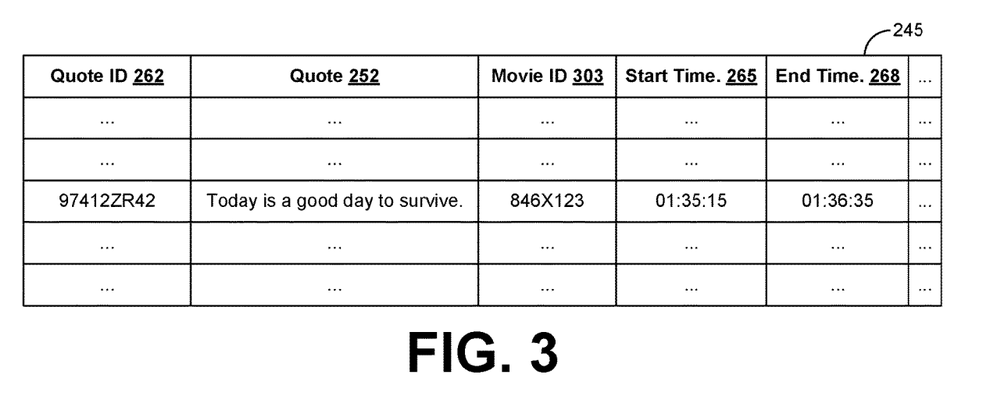
FIG. 3 is an example of a relational database for a quote database according to various embodiments of the present disclosure.

Referring next to FIG. 3, shown is an example of a relational database for the quote database 245 according to various embodiments of the present disclosure. As parsing closed captioning files 258 in response to a search query 106 can be time-consuming and computationally expensive, it is beneficial to build a quote database 245 independent from the closed captioning files 258 to improve query speed and efficiency. In some embodiments, the quote database 245 may include a relational database, such as a structured query language (SQL) database. In other embodiments, the quote database 245 may include a non-relational database, such as MongoDB or other "NoSQL" database. The quote database 245 can be consulted to improve the speed at which results are provided to the user in response to a search query 106.

In one example, each instance of a quote 252 may be provided a row in a relational database that includes columns for a quote identifier 262, a quote 252, a movie identifier 303, a start timestamp 265, an end timestamp 268, and/or other information. In some embodiments, the quote identifier 262 is an identifier that uniquely identifies the instance of the quote 252 in the movie 233. As the row may include a movie identifier 303 that uniquely identifies the movie 233 that includes the quote 252, the quote database 245 can be queried using the movie identifier 303 to identify all quotes 252 available in the quote database 245. The start timestamp 265 and the end timestamp 268 may be used by the media processing service 221 in serving up a media clip 236 that includes an iteration of the quote 252 in the movie 233 or other media content.

In some embodiments, the movie identifier 303 may include a video asset identifier. For a given movie 233, different versions of the movie 233 may exist, such as a UK release, a US release, an edited release for television, a director's cut, etc. Accordingly, the quote 252 may correspond to a particular version of a movie 233 or other media content item capable of being identified using the video asset identifier. The start timestamp 265 and the end timestamp 268 may be generated from a closed captioning file 258 corresponding to the particular video asset identifier.

Figure 4:
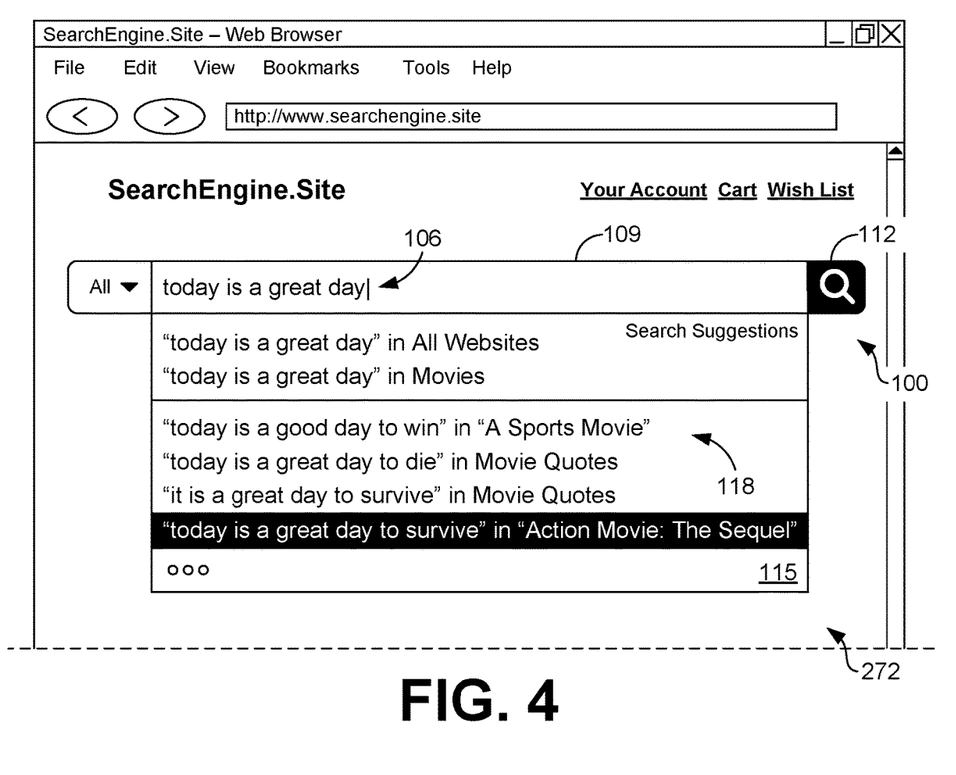
FIG. 4 is an example user interface rendered by a client device in the networked environment of FIG. 2 according to various embodiments of the present disclosure.

Turning now to FIG. 4, shown is an example of a user interface 272 rendered by the client device 206 in the networked environment 200 of FIG. 2 according to various embodiments of the present disclosure. In one embodiment, the user interface 272 is generated by the search engine application 215. In another embodiment, the user interface 272 may be generated by the movie database application 224 to provide a search component 100 capable of navigating a network site.

In the example of FIG. 4, a user may search for a quote 252, such as a quote made famous by a movie 233 or other type of media content. By selecting or otherwise manipulating a submit component 112, a search may be performed using the search query 106 provided in the text area 109. However, when searching for a quote 252 from a particular movie 233, users are sometimes unable to properly recite an exact use of the quote 252. For example, a user may enter "today is a great day to survive" as the search query 106 when, in fact, the quote from the particular movie 233 actually recites, "it is a great day to survive." Accordingly, the approximate string matching service 218 may be utilized to query the quote database 245 and/or the closed captioning files 258 to serve up search results in response to a search query 106.

Figure 5:
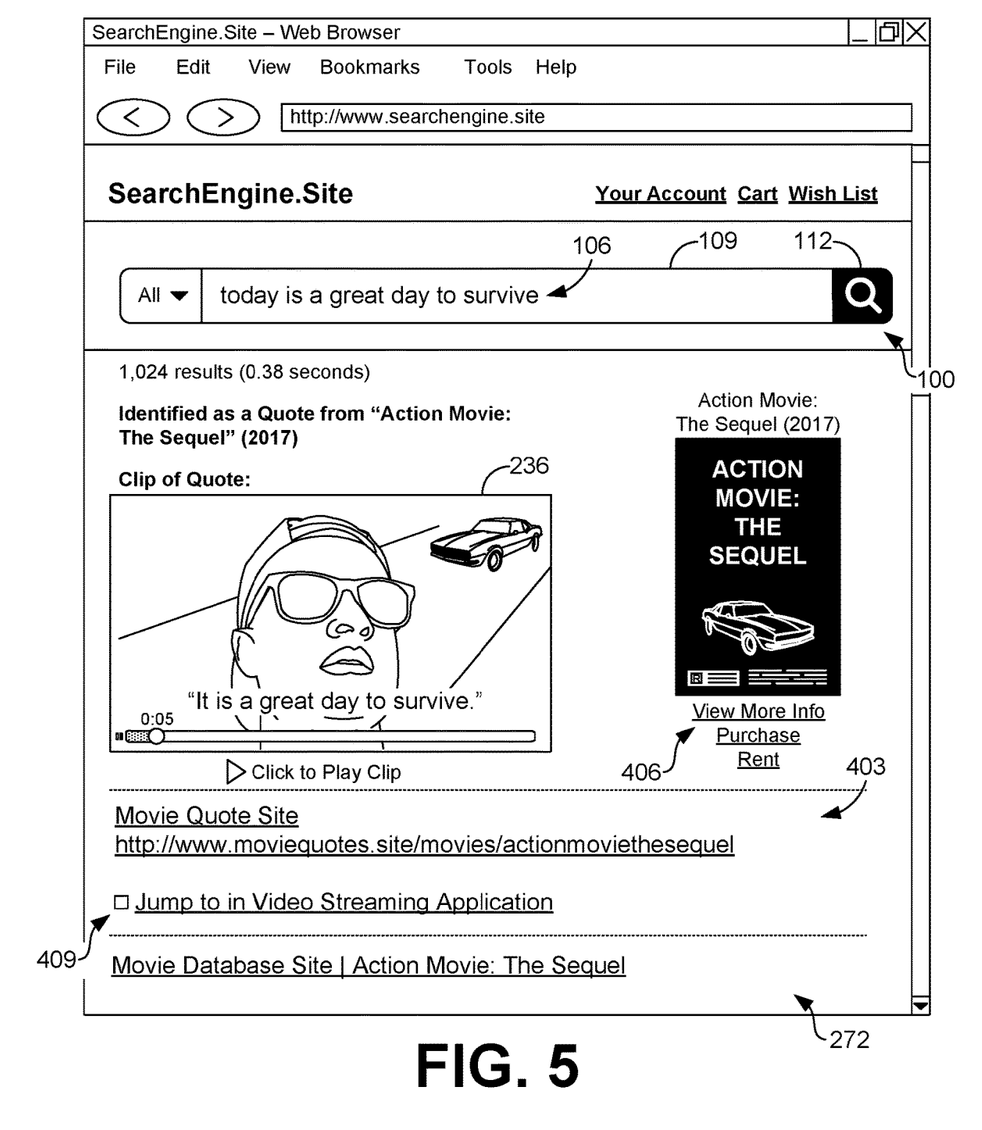
FIG. 5 is another example user interface rendered by a client device in the networked environment of FIG. 2 according to various embodiments of the present disclosure.

Moving on to FIG. 5, shown is another example of a user interface 272 rendered by the client device 206 in the networked environment 200 of FIG. 2 according to various embodiments of the present disclosure. When a search query 106 has been provided using the search component 100, the search engine application 215 may serve up results based on the search query 106. For example, the search engine application 215 may provide a listing of network sites 403 that were located based on one or more words or operators (e.g., Boolean operators) set forth in the search query 106.

In the example of FIG. 5, the user interface 272 may serve up a media clip 236 that includes the recitation of the quote 252 in a movie 233 or other media content. Thus, when a user performs a search using the search component 100, a media clip 236 that includes the quote 252 recited in the search query 106, or its approximate match, is located and a corresponding media clip 236 is presented to the user. Additionally, the user interface 272 may include media information 406 pertaining to the movie 233 or other type of media content. In some examples, the media information 406 may include a hyperlink or other suitable user interface component that permits a user to purchase, rent, or otherwise consume the movie 233 or media content. In other examples, the media information 406 may include a hyperlink that permits a user to view an item page corresponding to the movie 233 or other media content.

In some examples, a quote 252 or a region in the listing of network sites 403 may include a hyperlink 409 that permits a user to jump to the start timestamp 265 in a media streaming application, such as a subscription-based video streaming application. In further examples, execution of the media streaming application may be terminated and the user returned to the user interface 272 when the end timestamp 268 is reached.

Figure 6:
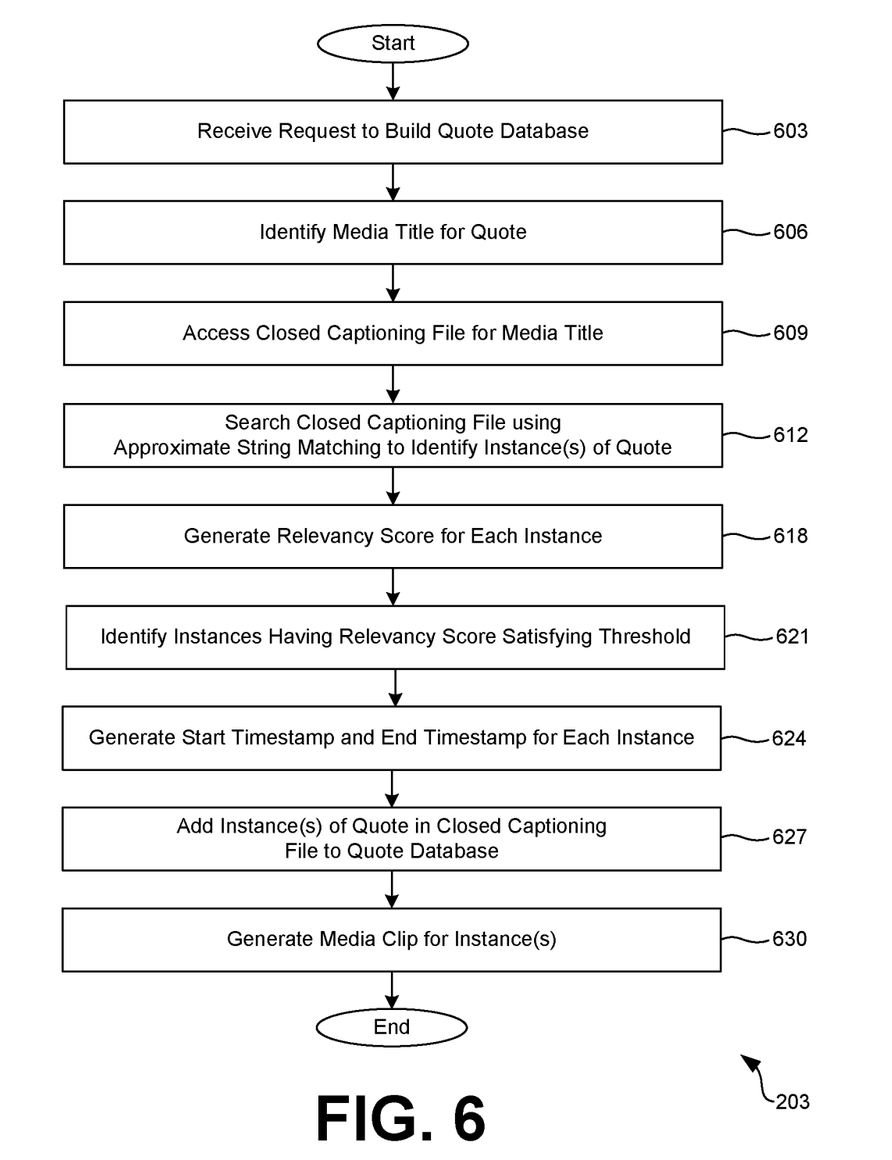
FIGS. 6-8 are flowcharts illustrating example functionality implemented by a computing environment in the networked environment of FIG. 2 according to various embodiments of the present disclosure.

Referring next to FIG. 6, shown is a flowchart that provides an example operation of the computing environment 203 according to various embodiments. It is understood that the flowchart of FIG. 6 provides merely an example of the many different types of functional arrangements that may be employed to implement the operation of the computing environment 203 as described herein. As an alternative, the flowchart of FIG. 6 may be viewed as depicting an example of elements of a method implemented in the computing environment 203 according to one or more embodiments.

As parsing closed captioning files 258 in response to a search query 106 can be processor- and network-intensive, it is beneficial to build a quote database 245 independent from the closed captioning files 258. In some embodiments, the quote database 245 may include a relational database, as shown in FIG. 3, such as a SQL database. In other embodiments, the quote database 245 may include a non-relational database, such as MongoDB or other "NoSQL" database. As may be appreciated, the quote database 245 can be consulted to improve the speed at which results are provided to the user after a search or other request. The flowchart of FIG. 6 may describe functionality of the computing environment 203 employed to build portions of the quote database 245. Beginning with 603, the computing environment 203 may receive a request to build a quote database 245.

In some embodiments, the computing environment 203 may construct a portion of the quote database 245 using popular quotes 252 crowdsourced from users of the movie database application 224. For example, a user may submit a quote 252 for a particular movie where other users are able to vet whether the quote 252 is an accurate portrayal of a line or conversation made by one or more characters 248 of the movie 233. As the movie database application 224 maintains quotes 252 for in the movie database 230, the computing environment 203 may query to the data store 212 to locate popularly accessed or searched quotes 252, from which the quote database 245 may be constructed.

In 606, the computing environment 203 may identify a media title (e.g., a title of a movie 233) for the quote 252. For example, in the embodiments where a popular quote 252 is accessed to construct the quote database 245, the computing environment 203 may query the data store 212 to identify a movie 233 corresponding to the popular quote 252.

Next, in 609, the closed captioning file 258 for the media title is accessed from the data store 212 and, in 612, the closed captioning file 258 is searched using the quote 252 received in the request. As may be appreciated, the closed captioning file 258 may include plain-text data used by video playing applications or devices to render subtitles or other captions on a display during corresponding portions of the movie 233. An example of a line in a plain-text closed captioning file 258 may include:

[01:35:15] Today is a good day to survive [01:36:35], where the caption "Today is a good day to survive" is shown on the screen at one hour, thirty-five minutes, and fifteen seconds in the movie 233 for a duration of one minute and twenty seconds, or until one hour, thirty-six minutes, and thirty-five seconds is reached. However, some closed captioning files 258 may be difficult to search as some closed captioning files 258 may include quotes 252, or portions thereof, interrupted by other captions. This may occur in instances where multiple characters 248 are speaking or when an event occurs that is explained on the screen. The example of the quote 252 above is shown being interrupted by an explosion:

[01:35:15] Today is a . . . [01:35:20]
[01:35:21] *EXPLOSION* [01:36:15]
[01:36:16] . . . good day to survive. [01:36:35].

As a first portion of the quote 252 is at a different location from a second portion of the quote 252, a plain-text for the quote 252 may not result in a match. Accordingly, in some embodiments, the approximate string matching service 218 may be employed to perform to find non-exact matches. Approximate string matching relates to the process of comparing two items and determining a level of similarity between the two items. When approximate string matching is employed, a metric may be generated that describes the level of similarity between the two items. If the metric meets a reliability threshold 242 that indicates that the two items are, in fact, a match, the search may yield the location, line numbers, or instance of the match.

As may be appreciated, in some movies 233, a quote 252 may occur in more than one location of the movie 233. If at least one quote 252 has been located, the process may proceed to 618 where a relevancy score for each match in the closed captioning file 258 may be generated. The relevancy score may be used to determine whether an instance of the quote 252 appearing in the closed captioning file 258 is likely to be the quote 252 for which the user searched. For example, a user may desire to find the instance where a notable character recited the quote 252 in a popular scene, as opposed to a minor character reciting the quote 252 in a less popular scene.

According to various embodiments, the relevancy score for a match, or an instance of the quote 252 appearing in the closed captioning file 258, may be determined based on a character 248 reciting the quote 252, a time at which the quote 252 will be rendered during a playback of the movie 233, popularity of the movie 233, or other factors. In further embodiments, the instance of the quote 252 may be vetted by users of a network site by crowdsourcing the quote 252 to its users. For example, the movie database application 224 can generate video clips of the difference instances of the quote 252 in the movie 233. A more-engaged one of the video clips may be more relevant than a less-engaged one of the video clips. Accordingly, the instance of the quote 252 for the more-engaged one of the video clips may be associated with a higher relevancy score than the instance of the quote 252 for the less-engaged one of the video clips.

In further embodiments, the search query 106 used to generate the request may be employed to generate the relevancy score for an instance of the quote 252. For example, if the search query 106 includes, "Today is a good day to survive spoken by John Smith," the phrase "spoken by John Smith" may be used to determine whether the instance of the quote 252 was spoken by a character named John Smith or an actor named John Smith. If so, that instance may be afforded more relevancy than another instance of the quote 252 where the character or actor is not John Smith.

Moving on to 621, the computing environment 203 may filter irrelevant instances of the quote 252 found in the closed captioning file 258 by identifying only those instances having a relevancy score that meets a reliability threshold 242. As the reliability threshold 242 may be indicative of the instance being relevant, instances of the quote 252 not satisfying the reliability threshold 242 may be filtered, removed from the process, and/or not stored in the quote database 245.

In 624, a start timestamp 265 and an end timestamp 268 may be generated for each instance of the quote 252 in the closed captioning file 258 that satisfies the reliability threshold 242. In some embodiments, the start timestamp 265 and the end timestamp 268 may be generated using the start time and the end time included in the closed captioning file 258. In other embodiments, the start timestamp 265 and the end timestamp 268 may be crowdsourced from users of a network site, such as users of the movie database application 224. Additionally, the start timestamp 265 and the end timestamp 268 for the quote 252 may be updated in response to crowdsourcing events, such as a predefined amount of users changing the first timestamp 265 or the end timestamp 268 to a different value.

In 627, the one or more instances of the quote 252 in the closed captioning file 258 are added to the quote database 245. In one example, each instance of the quote 252 may be provided a row in a relational database that includes columns for a quote identifier 262, the quote 252, a movie identifier 303, a start timestamp 265, an end timestamp 268, and/or other information. In some embodiments, the quote identifier 262 is an identifier that uniquely identifies the instance of the quote 252 in the movie 233. As the row may include a movie identifier 303 that uniquely identifies the movie 233 that includes the quote 252, the quote database 245 can be queried using the movie identifier 303 to identify all quotes 252 available in the quote database.

In 630, a media clip 236 may be generated that includes the instance of the quote 252 in the movie 233. The media clip 236 may include audio, video, or a combination thereof obtained from the video file 255 corresponding to the movie 233. For example, a scene of the movie 233 may be cut from the video file 255 using the start timestamp 265 and the end timestamp 268. In some examples, a predefined amount of time may be added or reduced from the start timestamp 265 or the end timestamp 268 to provide or reduce context for the quote 252.

As shown in FIG. 5, the computing environment 203 can serve up the media clip 236 in response to a search query performed for the quote 252 by a user of the search engine application 215. In other embodiments, the movie database application 224 can encode the media clip 236 in a network page or other user interface for access by the user. If a user accesses a network page or user interface screen for a movie 233, the movie database application 224 can serve up one or more media clips 236 having quotes 252 used in the movie 233. As the quotes 252 used to build the quote database 245 may be popular quotes 252 frequently searched or otherwise vetted by users of the movie database application 224, only media clips 236 reciting popular quotes 252 may be rendered. Thereafter, the process may proceed to completion.

Figure 7:
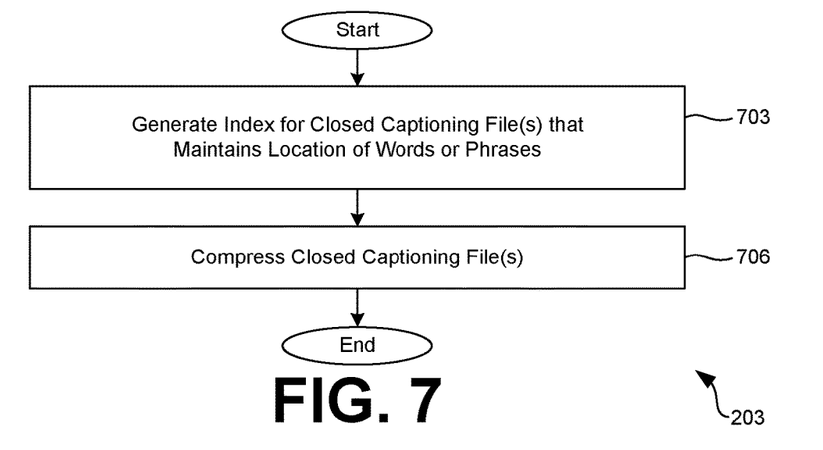

Referring next to FIG. 7, shown is a flowchart that provides an example operation of the computing environment 203 according to various embodiments. It is understood that the flowchart of FIG. 7 provides merely an example of the many different types of functional arrangements that may be employed to implement the operation of the computing environment 203 as described herein. As an alternative, the flowchart of FIG. 7 may be viewed as depicting an example of elements of a method implemented in the computing environment 203 according to one or more embodiments.

While querying the quote database 245 may improve search times, page loading times, or other uses of the quotes 252 by the computing environment 203 or third-party services, in some embodiments, the closed captioning files 258 may be optimized for more efficient searches. As may be appreciated, this may improve the time for building or modifying the quote database 245, or, in embodiments in which the closed captioning file 258 is utilized in responding to a request, the search of the closed captioning file 258 can be optimized for improved speed and efficiency.

Additionally, in situations where a movie 233 for a quote 252 is not able to be identified in a readily accessible database, hundreds to thousands of closed captioning files 258 might have to be searched until a matching instance of the quote 252 is located. Hence, in 703, an index may be generated for the closed captioning files 258 that maintains a location of words or phrases in particular ones of the closed captioning files 258. As may be appreciated, an index may be utilized to improve speed and decreases processing complexity when locating matching instances of a quote 252 in the closed captioning files 258. As may be appreciated, without an index, the search engine application 215 would be required to scan each line in each closed captioning file 258 until a matching instance of the quote 252 is found, which could drastically affect search time and processing complexity.

TABLE 1

Example Index of Multiple Movies having Closed Caption Files 258 that Recite Particular Words

| Word | Movies |
| --- | --- |
| survive | Action Movie; Action Movie: The Sequel; My Romantic Movie |
| love | My Romantic Movie |
| football | A Sports Movie |

For example, the index shown in Table 1 may be consulted in response to a query using the quote 252 of "Today is a good day to survive." As the word "survive" is used in the quote 252, it can be used to query the index to identify only the movies 233 that recite the word "survive" in its corresponding closed captioning file 258. In some embodiments, the index may be generated using words appearing less frequently in the closed captioning files 258 as compared to other words.

In 706, the closed captioning file 258 can be compressed which may increase search times and lessen file storage. In one example, the closed captioning file 258 can be compressed by removing the time tags (e.g., the start time and the end time in a line in the closed captioning file 258) from the closed captioning file 258, thereby reducing an amount of text required to be parsed to identify a matching instance of a quote 252. In other examples, non-spoken text may be removed, such as identifiers that describe a sound appearing in the movie (e.g., "Explosion," "Music," etc.). Other forms of compression may be applied to the closed captioning file 258, as may be appreciated. Thereafter, the process may proceed to completion.

Figure 8:
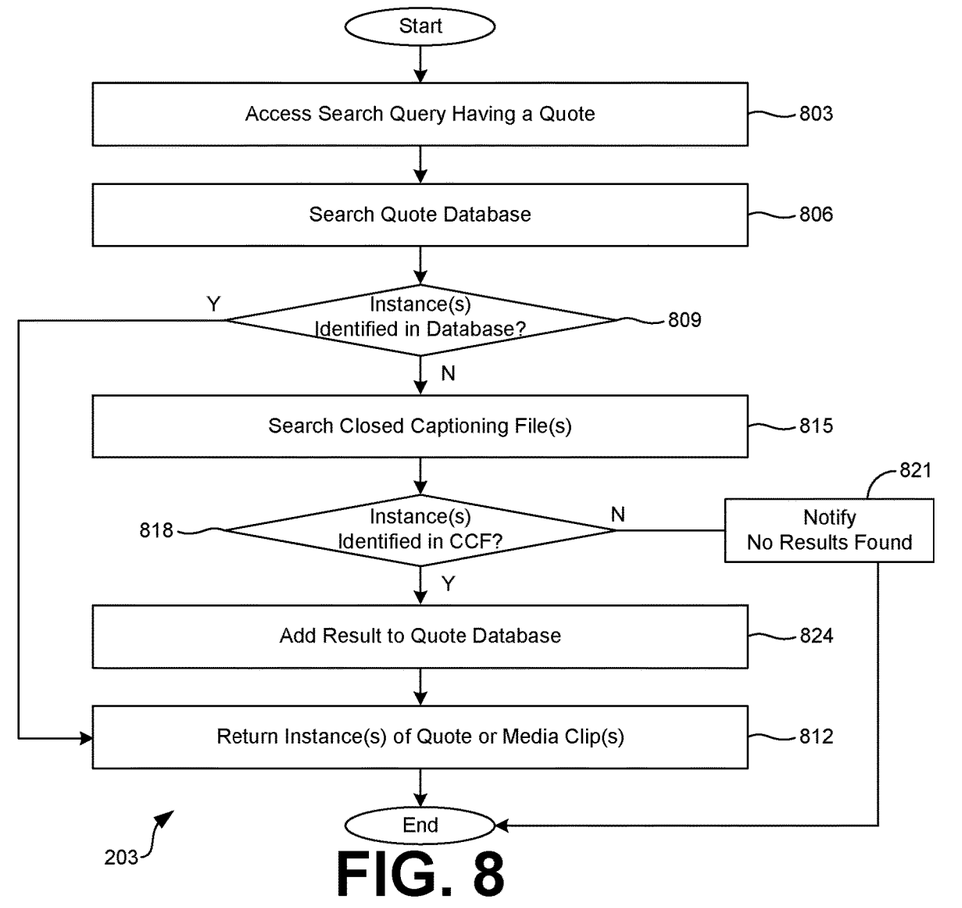

Referring next to FIG. 8, shown is a flowchart that provides an example operation of the computing environment 203 according to various embodiments. It is understood that the flowchart of FIG. 8 provides merely an example of the many different types of functional arrangements that may be employed to implement the operation of the computing environment 203 as described herein. As an alternative, the flowchart of FIG. 8 may be viewed as depicting an example of elements of a method implemented in the computing environment 203 according to one or more embodiments.

Beginning with 803, the computing environment 203 may access a request received for a quote 252, such as a quote 252 from a movie 233. In one embodiment, the request for the quote 252 is received by the search engine application 215, for example, when a user of the client device 206 provides a search query 106 that includes the quote 252. In another embodiment, the request for the quote 252 is received from the movie database application 224, for example, when a user accesses a network page for the movie 233. To this end, the movie database application 224 may serve up a list of quotes 252 pertaining to the movie 233 for inclusion in the network page.

Next, in 806, the computing environment 203 may search the quote database 245 to identify an instances of the quote 252 in one or more movies 233. As the quote database 245 may not include quotes 252 from less popular movies 233, or less popular quotes 252 from popular movies 233, in 809, the computing environment 203 may determine whether the request for the quote 252 has one or more instances identified in the quote database 245. If one or more matching instances are able to be identified, the process may proceed to 812 where the one or more instances of the quotes 252 in the one or more movies 233 (or information related therewith) may be returned. Additionally, in 812, a media clip 236 corresponding to an instance of the quote 252 in a movie 233 may be returned.

Returning to 809, if one or more matching instances are unable to be identified from the quote database 245, the process may proceed to 815 to search one or more closed captioning files 258 for the quote 252. In some embodiments, this may include searching an index of the one or more closed captioning files 258, as described above with respect to Table 1. In 818, it is determined whether one or more instances of the quote 252 are able to be identified in the one or more closed captioning files 258. If not, the process may proceed to 821 where the requesting service (or user) may be notified that no results were found. In other words, no matching instances of the quote 252 were able to be located in the quote database 245 or in the one or more closed captioning files 258. Afterwards, the process may proceed to completion.

Referring back to 818, if it is determined that one or more instances of the quote 252 were able to be identified in the one or more closed captioning files 258, the process may proceed to 824 to add the one or more instances of the quote 252 to the quote database 245 for use in future queries. Referring again to 812, the one or more instances of the quotes 252 in the one or more movies 233 (or information related therewith) may be returned and/or a media clip 236 corresponding to an instance of the quote 252 in a movie 233. Thereafter, the process may proceed to completion.

Figure 9:
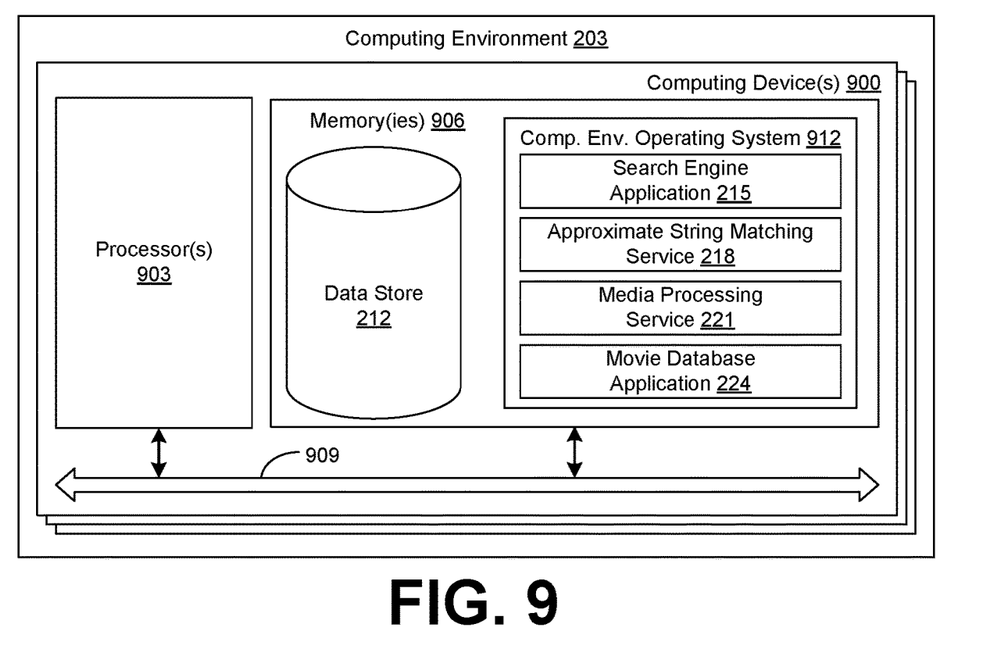
FIG. 9 is a schematic block diagram that provides an example illustration of a computing environment employed in the networked environment of FIG. 2 according to various embodiments of the present disclosure.

With reference to FIG. 9, shown is a schematic block diagram of the computing environment 203 according to an embodiment of the present disclosure. The computing environment 203 includes one or more computing devices 900. Each computing device 900 includes at least one processor circuit, for example, having a processor 903 and a memory 906, both of which are coupled to a local interface 909. To this end, each computing device 900 may include, for example, at least one server computer or like device. The local interface 909 may include, for example, a data bus with an accompanying address/control bus or other bus structure as can be appreciated.

Stored in the memory 906 are both data and several components that are executable by the processor 903. In particular, stored in the memory 906 and executable by the processor 903 are the search engine application 215, the approximate string matching service 218, the media processing service 221, the movie database application 224, and potentially other applications. Also stored in the memory 906 may be a data store 212 and other data. In addition, a computing environment operating system 912 may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may include additional systems designed to coordinate this communication, including, for example, performing load balancing. The processor 903 may be of electrical or of some other available construction.

Although the search engine application 215, the approximate string matching service 218, the media processing service 221, the movie database application 224, the client application 269, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Figure 10:
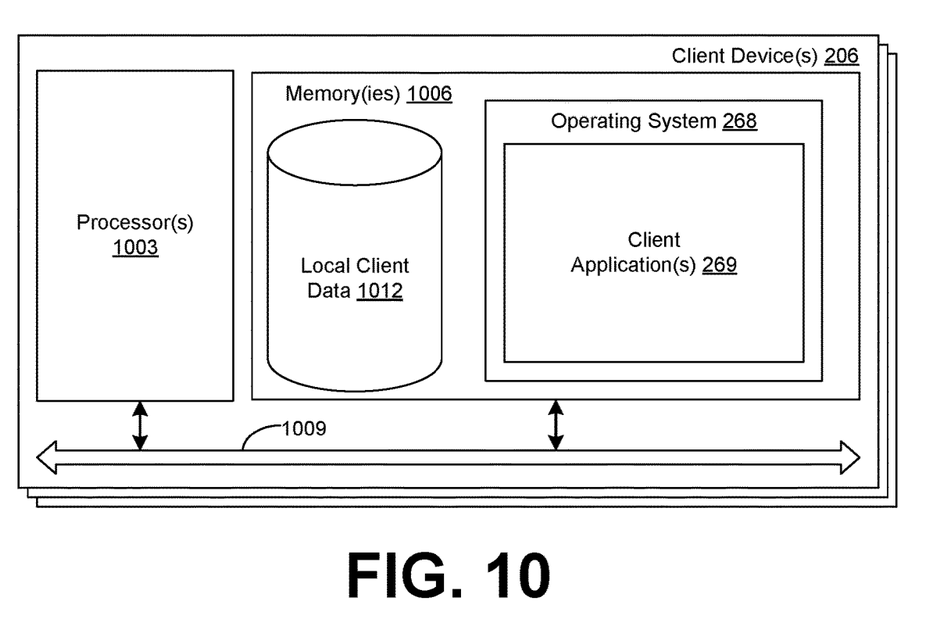
FIG. 10 is a schematic block diagram that provides an example illustration of a client device employed in the networked environment of FIG. 2 according to various embodiments of the present disclosure.

With reference to FIG. 10, shown is a schematic block diagram of the client devices 206 according to an embodiment of the present disclosure. Each client device 206 includes at least one processor circuit, for example, having a processor 1003 and a memory 1006, both of which are coupled to a local interface 1009. The local interface 1009 may include, for example, a data bus with an accompanying address/control bus or other bus structure as can be appreciated. Stored in the memory 1006 are both local client data 1012 and several components that are executable by the processor 1003. In particular, stored in the memory 1006 and executable by the processor 1003 are the operating system 268, the client application 269, and other data.

The flowcharts of FIGS. 6-8 show the functionality and operation of an implementation of portions of the computing environment 203. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 6-8 show a specific order of execution, it is understood that the order of execution may differ from that which is depicted. For example, the order of execution of two or more blocks may be scrambled relative to the order shown. Also, two or more blocks shown in succession in FIGS. 6-8 may be executed concurrently or with partial concurrence. Further, in some embodiments, one or more of the blocks shown in FIGS. 6-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search engine application 215, the approximate string matching service 218, the media processing service 221, the movie database application 224, and the client application 269, that includes software or code can be embodied in any non-transitory computer-readable medium for use by or in connection with an instruction execution system such as, for example, a processor 903 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the search engine application 215, the approximate string matching service 218, the media processing service 221, the movie database application 224, and the client application 269, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 900, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium comprising program instructions executable by at least one computing device that, when executed, cause the at least one computing device to:
   receive a request to construct and consult a quote database for use in a search application;
   access a quote from a data store;
   identify at least one of a plurality of media titles corresponding to the quote;
   search the quote database to determine that an approximate match of the quote does not reside in the quote database;
   in an instance in which the approximate match of the quote does not reside in the quote database, access a closed captioning file corresponding to the at least one of the plurality of media titles;

search an index generated for the closed captioning file using approximate pattern matching to determine that the approximate match of the quote resides in the closed captioning file by:
  locating a plurality of approximate substring matches in the closed captioning file;
  generating a relevancy metric for individual ones of the approximate substring matches describing a similarity of the quote and a respective one of the approximate substring matches; and
  identifying one of the approximate substring matches as being the approximate match based at least in part on the relevancy metric generated for the one of the approximate substring matches satisfying a reliability threshold;
in an instance in which the approximate match of the quote resides in the closed captioning file:
  identify a start time and an end time for the quote from the closed captioning file;
  store the quote in the quote database in association with the at least one of the plurality of media titles, the start time, and the end time; and
  generate a media clip for the quote by extracting a portion of a media file corresponding to at least one of the plurality of media titles based on the start time and the end time;
  update the index for the closed captioning file, the index comprising a location of at least one word or phrase in the closed captioning file; and
  compress the closed captioning file to increase future search times by removing at least one of: a plurality of time tags and non-spoken text;
subsequent to a construction of the quote database, in an instance in which a search query is included in a field of the search application:
  perform approximate pattern matching to query the quote database using the search query; and
  in response to a result of the approximate pattern matching being determined, provide a suggested search term in a search engine auto-complete component based at least in part on data associated with the quote accessed from the quote database.

2. The non-transitory computer-readable medium of claim 1, further comprising program instructions executable by the at least one computing device that, when executed, cause the at least one computing device to send the media clip to a client device in response to a search query made by the client device that includes the quote.

3. The non-transitory computer-readable medium of claim 1, further comprising program instructions executable by the at least one computing device that, when executed, cause the at least one computing device to:
  identify that the approximate match is one of a plurality of approximate matches of the quote residing in the closed captioning file;
  identify that the relevancy metric generated for a portion of the plurality of approximate matches satisfies a predefined threshold; and
  in response to the relevancy metric satisfying the predefined threshold, store information associated with the portion of the plurality of approximate matches in the quote database.

4. A system, comprising:
at least one computing device comprising memory and at least one hardware processor;
program instructions stored in the memory and executable by the at least one computing device that, when executed, cause the at least one computing device to:
  receive at least a portion of a quote in a field of a search application shown in a display of a client device;
  query a quote database to determine that an approximate match of the quote does not reside in the quote database;
  in an instance in which the approximate match does not reside in the quote database, search at least one closed captioning file to determine that the approximate match of the quote resides in the at least one closed captioning file by:
    locating a plurality of approximate substring matches in the at least one closed captioning file;
    generating a relevancy score for individual ones of the approximate substring matches comprising a metric describing a similarity of the quote and a respective one of the approximate substring matches; and
    identifying one of the approximate substring matches as being the approximate match of the quote based at least in part on the relevancy score generated for the one of the approximate substring matches satisfying a reliability threshold; and
  in response to the approximate match of the quote residing in the at least one closed captioning file, cause information associated with the quote to be communicated to the client device for display;
  generate or update an index for the at least one closed captioning file, the index comprising a location of at least one word or phrase in the at least one closed captioning file;
  compress the at least one closed captioning file to increase future search times by removing at least one of: a plurality of time tags and non-spoken text; and
  in response to the quote being included in the field of the search application, perform approximate pattern matching to query the quote database using the quote included in the field and provide at least one suggested search in the search application based at least in part on data associated with the quote accessed from the quote database.

5. The system of claim 4, wherein the approximate match of the quote residing in the closed captioning file is identified by an approximate pattern matching service.

6. The system of claim 4, further comprising program instructions executable by the at least one computing device that, when executed, cause the at least one computing device to add the information associated with the quote to the quote database for use in at least one future search query.

7. The system of claim 6, wherein the information associated with the quote further comprises a start timestamp and an end timestamp identified from the closed captioning file.

8. The system of claim 7, further comprising program instructions executable by the at least one computing device that, when executed, cause the at least one computing device to generate a media clip for the quote by extracting a portion of a media file based on the start timestamp and the end timestamp.

9. The system of claim 8, further comprising program instructions executable by the at least one computing device that, when executed, cause the at least one computing device to cause a transmission of the media clip to the client device for display.

10. The system of claim 4, further comprising program instructions executable by the at least one computing device that, when executed, cause the at least one computing device to identify a media title corresponding to the at least one closed captioning file in response to the approximate match of the quote residing in the at least one closed captioning file.

11. A computer-implemented method, comprising:
receiving, by at least one computing device comprising at least one hardware processor, a search query from a client device, the search query being generated using a search application;
determining, by the at least one computing device, that the search query comprises a quote;
in response to the search query comprising the quote, querying, by the at least one computing device, a quote database to determine that no matching entry of the quote resides in the quote database;
generating, by the at least one computing device, a search index for at least one closed captioning file, the index comprising a location of at least one word or phrase in the at least one closed captioning file;
compressing, by the at least one computing device, the at least one closed captioning file to increase search times by removing at least one of: a plurality of time tags and non-spoken text;
in response to no matching entry of the quote not residing in the quote database, searching, by the at least one computing device, the at least one closed captioning file or the search index to determine that a matching instance of the quote resides in the at least one closed captioning file by:
locating a plurality of approximate substring matches in the at least one closed captioning file;
generating a relevancy score for individual ones of the approximate substring matches comprising a metric describing a similarity of the quote and a respective one of the approximate substring matches; and
identifying one of the approximate substring matches as being the matching instance of the quote based at least in part on the relevancy score generated for the one of the approximate substring matches satisfying a reliability threshold;
in an instance in which the quote resides in the at least one closed captioning file, accessing, by the at least one computing device, information associated with the quote; and
in an instance in which a search query is included in a field of the search application:
performing, by the at least one computing device, approximate pattern matching to query the quote database using the search query; and
in response to a result of the approximate pattern matching being determined, providing, by the at least one computing device, a suggested search term in a search engine auto-complete component based at least in part on the information associated with the quote accessed from the closed captioning file.

12. The computer-implemented method of claim 11, wherein the matching instance of the quote residing in the closed captioning file is an approximate match identified by an approximate pattern matching service.

13. The computer-implemented method of claim 11, further comprising adding, by the at least one computing device, the information associated with the matching instance of the quote to the quote database for use in at least one future search query.

14. The computer-implemented method of claim 13, wherein the information associated with the matching instance of the quote comprises a start timestamp and an end timestamp identified from the closed captioning file.

15. The computer-implemented method of claim 14, further comprising generating, by the at least one computing device, a media clip for the quote by extracting a portion of a media file based on the start timestamp and the end timestamp.

16. The computer-implemented method of claim 11, further comprising identifying, by the at least one computing device, a media title corresponding to the at least one closed captioning file in response to the matching instance of the quote residing in the at least one closed captioning file.

17. The non-transitory computer-readable medium of claim 1, wherein the non-spoken text is removed from the closed captioning file, the non-spoken text comprising at least one identifier that describes a sound appearing in the at least one of the plurality of media titles.

18. The non-transitory computer-readable medium of claim 1, wherein the search application is accessible through a network site.

19. The system of claim 7, further comprising program instructions executable by the at least one computing device that, when executed, cause the at least one computing device to store information associated with the quote, the information comprising at least the start timestamp and the end timestamp identified from the closed captioning file.

20. The system of claim 4, wherein the search application is accessible through a network site, the network site comprising a movie database network site or an electronic commerce network site.

* * * * *